United States Patent [19]

Torisawa

[11] Patent Number: 4,794,292

[45] Date of Patent: Dec. 27, 1988

[54] STEPPING MOTOR WITH DIVIDED STATOR POLE PIECES

[75] Inventor: Akira Torisawa, Machida, Japan

[73] Assignee: Canon Kabushiki Kaisha, Tokyo, Japan

[21] Appl. No.: 73,970

[22] Filed: Jul. 15, 1987

[30] Foreign Application Priority Data

Jul. 21, 1986 [JP] Japan .................................. 61-171307
Mar. 27, 1987 [JP] Japan ................................... 62-74771

[51] Int. Cl.⁴ ...................... H02K 19/02; H02K 21/14
[52] U.S. Cl. .................................. 310/257; 310/49 R
[58] Field of Search ...................... 310/49 R, 162, 257, 310/156

[56] References Cited

U.S. PATENT DOCUMENTS

| | | | |
|---|---|---|---|
| 3,496,393 | 2/1970 | Reieman et al. | 310/257 |
| 3,504,253 | 3/1970 | Kavanaugh | 310/257 |
| 3,549,918 | 12/1970 | Croymans et al. | 310/49 |
| 3,790,834 | 2/1974 | Tanaka | 310/257 |
| 4,656,381 | 4/1987 | Komatsu | 310/257 |

Primary Examiner—Patrick R. Salce
Assistant Examiner—D. L. Rebsch
Attorney, Agent, or Firm—Fitzpatrick, Cella, Harper & Scinto

[57] ABSTRACT

A stepping motor with a rotor having magnetic poles arranged at a constant pitch along the periphery, first and second stator sets each having stator poles at a constant pitch and arranged at a mutual offset of ¼ pitch with respect to the rotor, and coils for magnetizing the first and second stator sets, wherein each stator pole is provided with a magnetic polarity and is practically divided, at least on a face directed to the rotor, into plural areas, so as to form an area of a high magnetic reluctance at the center.

6 Claims, 14 Drawing Sheets

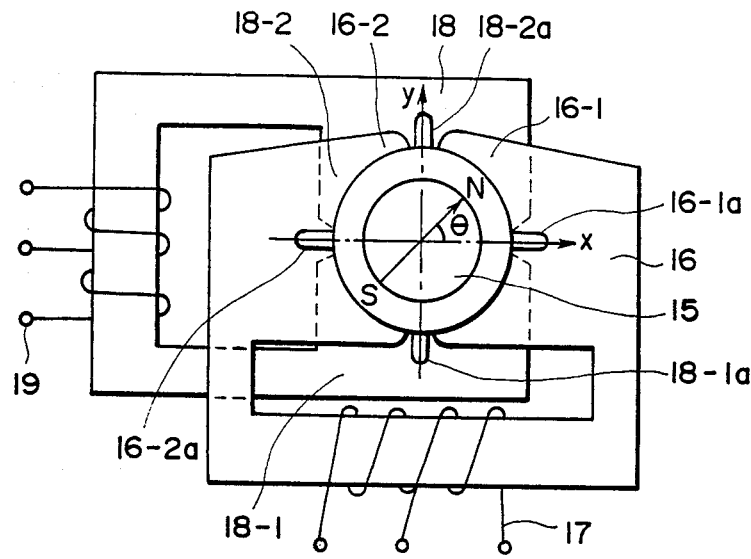
F I G. 12
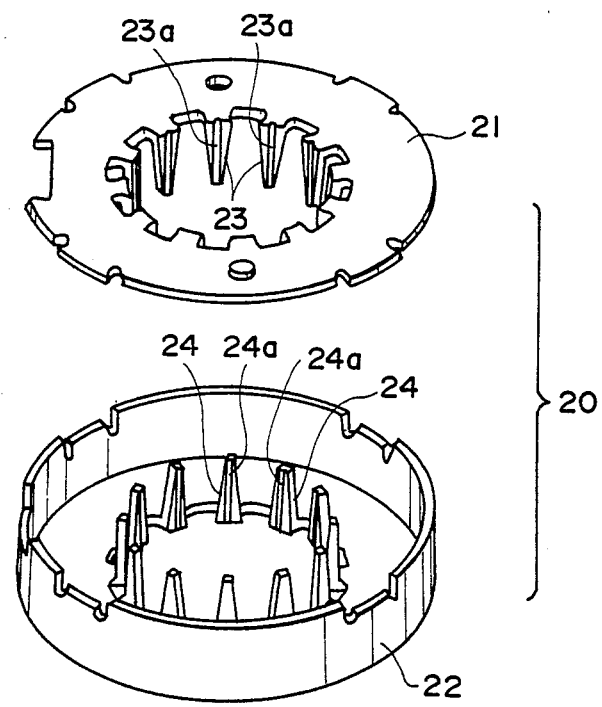
F I G. 13

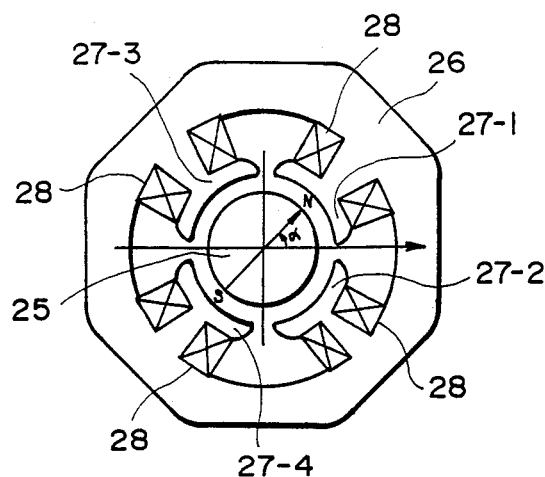
F I G. 16
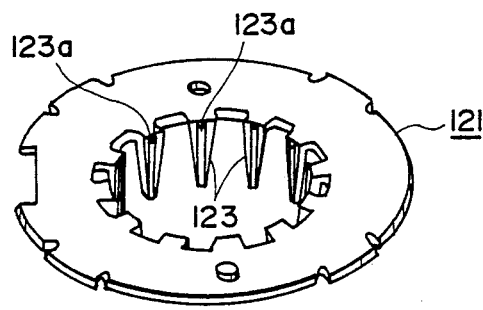
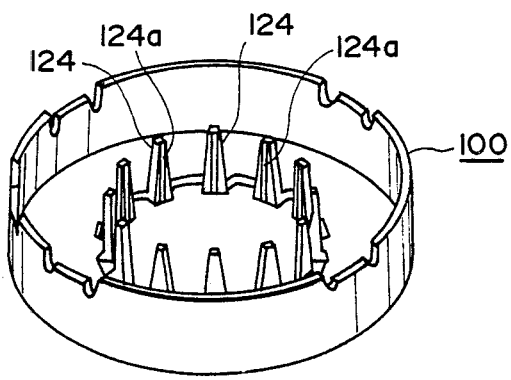
F I G. 17

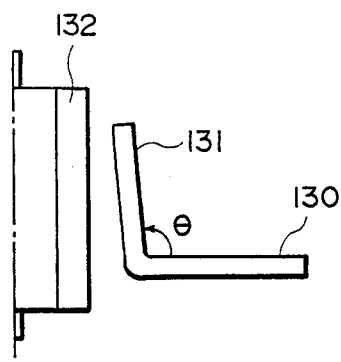
F I G. 18
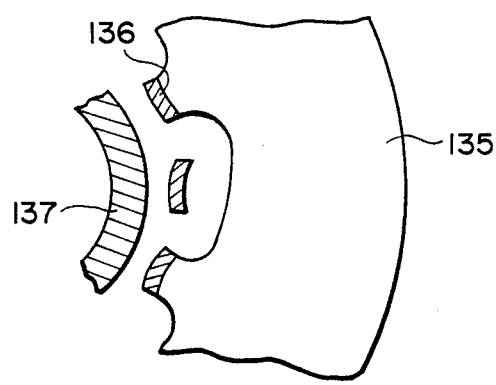
F I G. 19

STEPPING MOTOR WITH DIVIDED STATOR POLE PIECES

BACKGROUND OF THE INVENTION

1. Field of the Invention

The present invention relates to a stepping motor.

2. Related Background Art

FIG. 1 illustrates the structure of a stator set employed in a conventional stepping motor, having pole pieces arranged around and parallel to a rotor shaft, as disclosed, for example, in the U.S. Pat. No. 3,549,918, wherein a stator set is composed of stators 1, 2 respectively having comb-shaped stator poles 1a, 2a. The stator of the stepping motor is composed of said stator set and another identical stator set, arranged back to back at the stators 2, 2'. Said stators 2, 2' are provided with circular bosses 2b, 2b' and holes 2c, 2c' in such a manner that two stator sets are displaced mutually by a ¼ pitch.

FIG. 2 is a perspective view of a stepping motor constructed as explained above, wherein a rotor magnet 4 is coaxially fixed on a rotor shaft 3 for rotation about said shaft, and is provided, on the periphery facing the stator poles 1a, 2a, 1a', 2a', with the same number of magnetic poles as that of the stator poles in a stator set. In FIG. 1 there are provided 24 poles, N poles and S poles inclusive as in the rotor, or 12 pole pairs. Coils 5, 6 of bifilar winding are provided respectively on the stator sets.

FIG. 3 is a diagram of a driving circuit of the stepping motor, and FIG. 4 is a timing chart showing two-phase driving pulses supplied to said driving circuit.

FIG. 5A is an extended view of stator poles and rotor magnet, wherein two stator sets are represented by a (consisting of the stators 1', 2') and b (consisting of the stators 1, 2).

In the following there will be explained the stop position of the rotor when the coils are not energized and the cogging torque.

A two-pole stepping motor shown in FIG. 5D will now be taken as a model for considering the torque between a stator set a and the rotor. Said two-pole stepping motor corresponds to a pitch of the stepping motor shown in FIG. 2.

With the x- and y-axes defined as illustrated, the torque on the rotor 7 becomes zero when the center of the magnetic pole coincides with the center of the stator pole, or, at angles $\theta=0, \pi, 2\pi, \ldots, n\pi$.

Also at angles $\theta=\pi/2, 3\pi/2, \ldots, (2n-1)\pi/2$ the rotor 7 receives the same torques from the left and right stators 8, 9 so that the resulting torque is again zero. Assuming a sinusoidal change, the torque can be represented by:

$$Ta = a \sin 2\theta \tag{1}$$

thus varying at a period of $\pi$ which is a half of the period $2\pi$ of the stator poles.

The equation (1) can be written, with the number p of magnetic pole pairs of the stator or rotor, as $$Ta = a \sin 2p\theta \tag{2}$$

By substituting $p\theta = \alpha$, $$Ta = a \sin 2\alpha \tag{3}$$

The equation (2) is represented by a mechanical angle, while the equation (3) is represented by a electric angle, which will be used in the following explanation.

In FIG. 6, a curve Ta represents the cogging torque between the stator set a and the rotor. On the other hand, the torque between the stator set b and the rotor can be written, in consideration of the aberration of ¼ pitch of the stator set b with respect to the set a, as:

$$Tb = b_1 \sin 2p \left(\theta + \frac{1}{4} \cdot \frac{2\pi}{p}\right) = b_1 \sin 2p \left(\theta + \frac{\pi}{2p}\right) \tag{4}$$

or, for the electric angle as:

$$Tb = b_1 \sin 2\left(\alpha + \frac{\pi}{2}\right) = -b_1 \sin 2\alpha \tag{5}$$

Thus Tb is different from Ta merely in sign.

The cogging torque To of the entire stepping motor can be represented as the sum of cogging torques working on the rotor from two stator sets a, b so that $$\begin{aligned} To &= Ta + Tb \\ &= (a_1 - b_1) \sin 2\alpha. \end{aligned}$$

A curve To in FIG. 6 shows the cogging torque in case of $a_1 > b_1$. The cogging torque of the entire stepping motor is the same, in the same number and positions of the points where the torque is zero, as the torque between a single stator set and the rotor, and is different in that the peak value is smaller. The cogging torque is zero if $a_1 = b_1$, and can be set at an arbitrary magnitude if $a_1$ and $b_1$ are arbitrarily regulatable.

In the following there will be explained the relation between the stop position of the rotor and the positions where the cogging torque To is zero.

Between the magnetic energy W of the rotor magnet of a stepping motor and the cogging torque thereof there stands a general relation $$To(\alpha) = -\frac{\partial W}{\partial \alpha}$$

so that the magnetic energy W can be represented as:

$$\begin{aligned} W &= \int To(\alpha) d\alpha + W_0 \\ &= \int (a_1 - b_1) \sin 2\alpha \, d\alpha + W_0 \quad (a_1 > b_1) \\ &= -(a_1 - b_1)/2 \cdot \cos 2\alpha + W_0 \end{aligned} \tag{6}$$

FIG. 7 shows the relation between the magnetic energy mentioned above and the rotor position. The rotor 4 tends to stop at a position of minimum magnetic energy. At the positions $\alpha = \pi/2, 3\pi/2, \ldots, (2n-1)\pi/2$ where the cogging torque is equal to zero, the rotor is unstable and does not stop due to the high magnetic energy, unless the frictional force is high. Thus the rotor eventually stops in stable manner at the positions $\alpha = 0, \pi 2\pi, \ldots, n\pi$.

Thus the rotor stably stops where the value of the cogging torque changes from negative to positive, but it does not stop stably where said value changes from positive to negative.

As explained above, when the coils of a stepping motor are not energized, the stop positions of the rotor are $\alpha=0, \pi, 2\pi, \ldots, n\pi$ wherein n is an integer.

In the following there will be given an explanation on the operation of one-pitch rotation of the rotor when the coils of the stepping motor, shown in FIGS. 2 and 3, are energized as shown in FIG. 4, while making reference to the extended view of the stator poles and the rotor magnetic poles in FIG. 5A.

When the coils are not energized, the rotor 4 is positioned at $\alpha=0$ as already explained. Then, when the phases A and B are energized, the magnetic pole 4$a$ assumes a position at the center of or distanced by $\frac{1}{8}$ pitch from the stator poles 1$a$ and 1$a'$, or $\alpha=\pi/4$. At the succeeding energization of the phases B and $\overline{A}$, the magnetic pole proceeds to a position of $\frac{3}{8}$ pitch between $\frac{1}{4}$-pitch and $\frac{1}{2}$-pitch, or $\alpha=3\pi/4$. Then in response to the energization of the phases $\overline{A}$ and B, it assumes a position of $\frac{5}{8}$ pitch between $\frac{1}{2}$-pitch and $\frac{3}{4}$-pitch, or $\alpha=5\pi/4$. Then in response to the energization of the phases $\overline{B}$ and A, it assumes a position of $\frac{7}{8}$ pitch between $\frac{3}{4}$-pitch and one pitch, or $\alpha=7\pi/4$. Subsequently there is repeated the above-explained cycle, starting from the energization of the phases A and B.

Now reference is made to FIG. 5B for explaining the error in the stop angle of the rotor in the energized state of the coils. The upper positive half in the ordinate indicates a torque for reversing the movement of the rotor, while the lower negative half indicates a torque for assisting said movement.

The rotor is positioned at $\alpha=0$ in the unenergized state.

In the first step of energization, in which the phases A and B are energized, a torque indicated by a broken line 10 is generated to advance the rotor 4 to a position $\alpha=\pi/4$ where the energization torque is zero. On the other hand, at said position $\alpha=\pi/4$, there exists a cogging torque $(a_1-b_1)$ for returning the rotor toward the position $\alpha=0$. Consequently the rotor stops at a position where the cogging torque for returning the rotor is balanced with the rotor-advancing torque generated by the energization of the phases A and B. This stop position, $\alpha=\alpha_1$ shown in FIG. 5B, is in front of the proper stop position $\alpha=\pi/4$. In the second step, the phases $\overline{A}$, B are energized to generate a magnetization torque indicated by a broken line 11, acting to advance the rotor to a position $\alpha=3\pi/4$ where the magnetization torque is zero.

On the other hand, at said position $\alpha=3\pi/4$ there exists a cogging torque -$(a_1-b_1)$ for advancing the rotor. Consequently the rotor is stopped at a position where the advancing cogging torque is balanced with the rotor reversing torque generated by the energization of the phases $\overline{A}$ and B. This stop position, $\alpha=\alpha_2$ shown in FIG. 5B, is beyond the proper stop position $\alpha=3\pi/4$.

The process in the succeeding third step is same as that in the first step, whereby the rotor stops at a position $\alpha_3$ in front of the proper stop position $\alpha=5\pi/4$. The process in the fourth step is same as that in the second step, whereby the rotor stops at a position $\alpha_4$ beyond the proper stop position $\alpha=7\pi/4$. FIG. 5D shows the angular error of rotor position with respect to the proper stop position in ordinate and the number of steps of the stepping motor in abscissa. In the two-phase driving process the angular error of the rotor position changes its sign at every step, showing an excessive movement and a deficient movement alternatively. In this manner it has not been possible to achieve a uniform and exact movement.

SUMMARY OF THE INVENTION

In consideration of the foregoing, the object of the present invention is to provide a stepping motor capable of providing a uniform stepping angle of the rotor.

The above-mentioned object can be achieved according to the present invention by a structure in which each stator pole is practically divided into plural areas of a magnetic polarity, so as to form a central area of a high magnetic reluctance.

The area of a high magnetic reluctance at the center of the stator pole causes said stator pole to practically function as plural stator poles instead of a single pole. Consequently, in addition to the basic component, there is generated a secondorder high-frequency component which dissipates the formation of cogging torque at the stop position of the rotor, thereby reducing the angular error in the rotor position at each step.

BRIEF DESCRIPTION OF THE DRAWINGS

FIG. 12 is a schematic view of a first embodiment of the present invention;

FIG. 13 is a schematic view of a second embodiment of the present invention;

FIG. 16 is a schematic view of a third embodiment of the present invention; and

FIGS. 17 to 19 are schematic views of still other embodiments.

DETAILED DESCRIPTION OF THE PREFERRED EMBODIMENTS

At first there will be considered requirements for obtaining a stepping motor in which cogging torque is not generated at the energized position.

Since the stop positions of the rotor in the energized state are $\pm(2n-1)\pi/4$, $(n=1, 2, 3, \ldots)$, there can be obtained a stepping motor of a small angular error in each energizing step, by determining a magnetic energy characteristic showing minimum values at $\alpha = \pi/4$, $3\pi/4$, $5\pi/4$ and $7\pi/4$. A function that can assume minimum values at the abovementioned points is:

$$W = \Delta W \cos 4\alpha + W_0 (\Delta W > 0) \quad (7)$$

This function assumes a minimum value $W = W_0 - \Delta W$ at $\alpha = \pi/4$, $3\pi/4$, ... $(2n-1)\pi/4$. Thus the equation (7) represents the magnetic energy characteristic required for the stepping motor embodying the present invention.

Comparison of said equation (7) with the foregoing equation (6) clarifies that the equation (6) represents a basic wave component while the equation (7) represents a second-order harmonic wave component.

Figure 8:
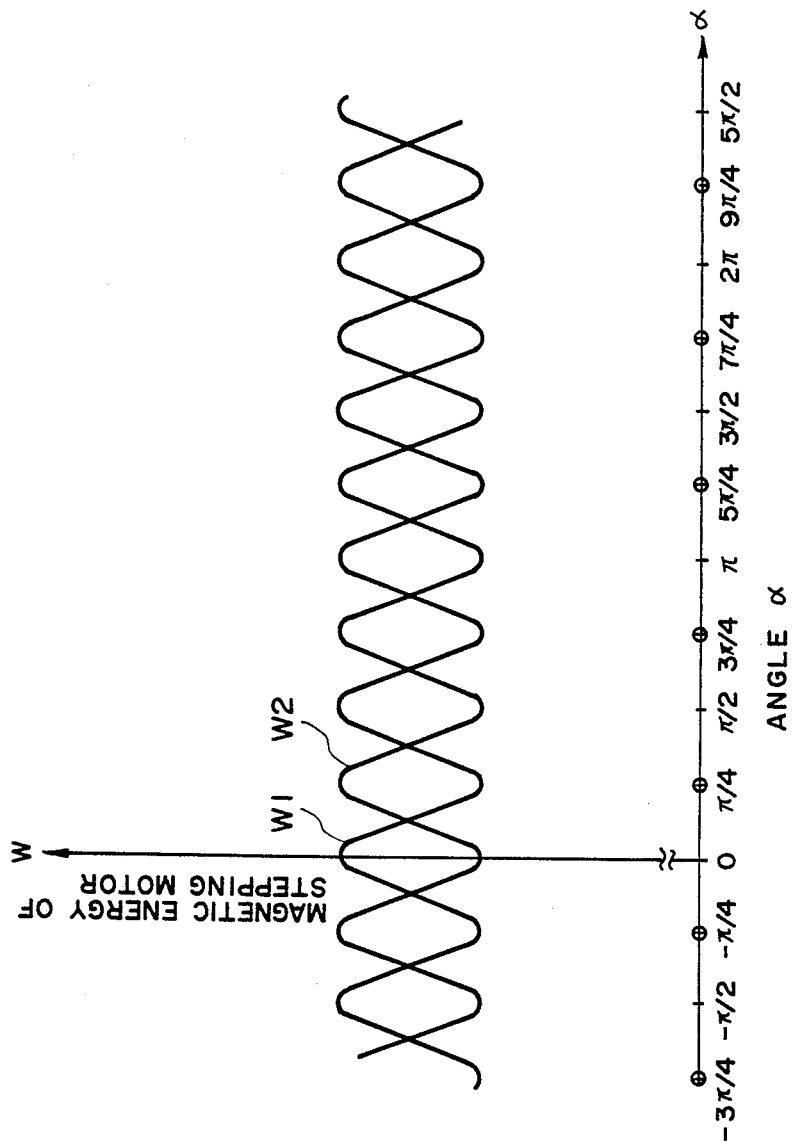
FIG. 8 is a chart showing the magnetic energy of the stepping motor embodying the present invention as a function of the angle $\alpha$.

In FIG. 8, a curve W1 corresponds to the equation (7) in case of $\Delta W > 0$, while a curve W2 corresponds to the same equation in case $\Delta W < 0$.

The cogging torque is obtained as follows, by differentiating the equation (7):

$$T = -4\Delta W \sin 4\alpha$$

Assuming that the cogging torque Ta between the stator set a and the rotor and the cogging torque Tb between the stator set b and the rotor are both represented by the sum of a basic wave component and a second-order harmonic wave component, the cogging torque Ta is represented by $Ta = a_1 \sin 2\alpha - a_2 \sin 4\alpha$, while the cogging torque Tb is represented by $Tb = b_1 \sin 2(\alpha + \pi/2) - b_2 \sin 4(\alpha + \pi/2)$, since the phase of the stator set b is advanced by a ¼ pitch with respect to that of the stator set a. Thus the cogging torque Tc of the stepping motor, obtained as the sum of Ta and Tb, is:

$$\begin{aligned} Tc &= Ta + Tb \\ &= (a_1 - b_1)\sin 2\alpha - (a_2 + b_2)\sin 4\alpha \end{aligned}$$

Thus, if $a_1 = b_1$, or if both basic wave components have a same amplitude, the cogging torque Tc is represented by the second-order harmonic wave components only, as:

$$Tc = (a_2 + b_2)\sin 4\alpha$$

The cogging torque becomes larger or smaller as $a_2$ and $b_2$ become larger or smaller. Thus the magnetic energy W of the stepping motor can be represented as:

$$\begin{aligned} W &= \int Tc d\alpha + W_0 \quad (8) \\ &= -(a_1 - b_1)/2 \cdot \cos 2\alpha + \\ &\quad (a_2 + b_2)/4 \cdot \cos 4\alpha + W_0 \end{aligned}$$

The above-mentioned curve W1 in FIG. 8 corresponds to the equation (8) in case of $a_1 = b_1$, $a_2 > 0$ and $b_2 > 0$. Also the curve W2 corresponds to the equation (8) in case of $a_1 = b_1$, $a_2 < 0$ and $b_2 < 0$.

On the other hand the cogging torque Ta between the stator set a and the rotor is represented by:

$$Ta = a_1 \sin 2\alpha - a_2 \sin 4\alpha$$

while the cogging torque Tb of the other stator set b is represented by:

$$Tb = b_1 \sin 2(\alpha + \pi/2) - b_2 \sin 4(\alpha + \pi/2)$$

Figure 9:
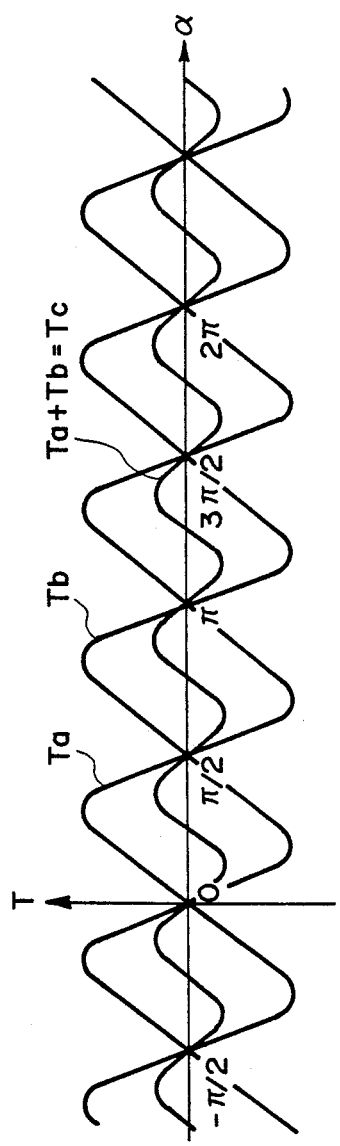
FIG. 9 is a chart showing the cogging torque as a function of the angle $\alpha$ in case $\Delta W > 0$.

FIG. 9 shows the torques Ta, Tb and the synthesized torque Tc ($= Ta + Tb$) in case $a_2 > 0$ and $b_2 > 0$, i.e. $\Delta W > 0$, wherein assumed are $a_1 > 0$ and $a_2 > 0$.

As will be seen in FIG. 9, Ta has a peak position slightly right to $\pi/4$, while Tb has a peak position slightly left to 90/4 because of the presence of negative second-order harmonic wave components $\sin 4\alpha$ and $\sin 4(\alpha + \pi/2)$. Due to the contribution of the second-order harmonic wave components mentioned above, the frequency of the synthesized torque Tc is twice as large as that of Ta, Tb. The rotor tends to stop at positions $\alpha = 0$, $\pi/4$, $\pi/2$, $3\pi/4$, $5\pi/4$, $3\pi/2$, $7\pi/4$, ... where the synthesized torque becomes zero. However the magnetic energy in this case is almost same as represented by the curve W1 in FIG. 8. Since the curve W1 peaks at $\alpha = 0$, $\pi/2$, $\pi$, $3\pi/2$, $2\pi$, ..., the rotor becomes unstable. Consequently the approximate stop positions of the rotor in non-energized state are $\alpha = \pi/4$, $3\pi/4$, $5\pi/4$, $7\pi/4$, ....

As explained before, these are the proper stop positions of the rotor in the energized state, so that the rotor can precisely stop at these positions in the energized state without being affected by the cogging torque. Also the rotor does not rotate before and after the interruption of magnetization.

Figure 10:
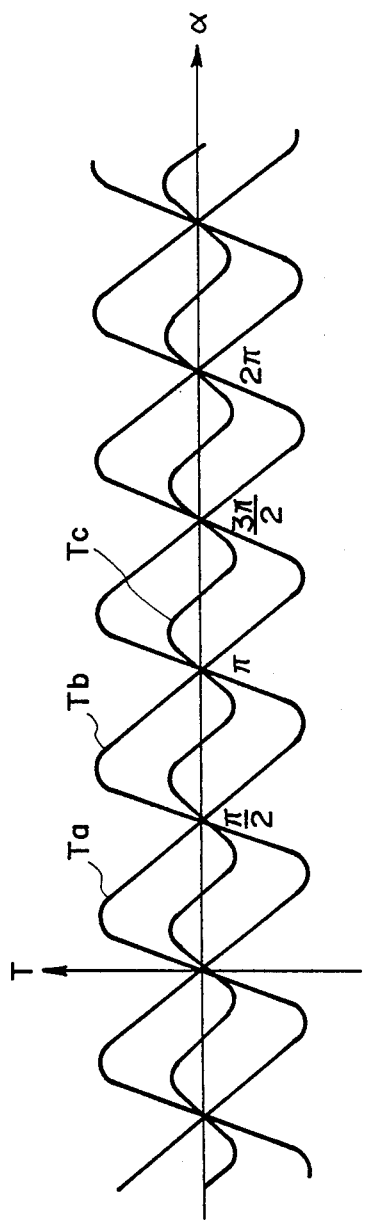
FIG. 10 is a chart showing the cogging torque as a function of the angle $\alpha$ in case $\Delta W < 0$.

FIG. 10 shows Ta, Tb, and Tc in case of $a_2 < 0$ and $b_2 < 0$ ($a_1 > 0$, $b_1 > 0$), or $\Delta W < 0$. In comparison with FIG. 9, the peak of Ta is positioned left to $\pi/4$ while that of Tb is positioned right to $\pi/4$, because of the presence of positive second-order harmonic wave components $\sin 4\alpha$ and $\sin 4(\alpha + \pi/2)$. Also in comparison with FIG. 9, the synthesized torque Tc is inverted in phase. However the synthesized torque Tc is zero at the stop positions of rotor $\pi/4$, $3\pi/4$, $5\pi/4$, $7\pi/4$, ... in the energized state. Thus the rotor can stop at the proper stop positions in the energized state, as the interferring cogging torque is not generated.

In this case, however, the magnetic energy is in the state of W2 in FIG. 8, so that the rotor eventually stops, in the non-energized state, at $\alpha = 0$, $\pi/2$, $\pi$, $3\pi/2$, $2\pi$, .... These positions are different from the proper stop positions of the rotor in the energized state, so that the rotor rotates by $\pi/4$, when the energization is removed.

Figure 11:
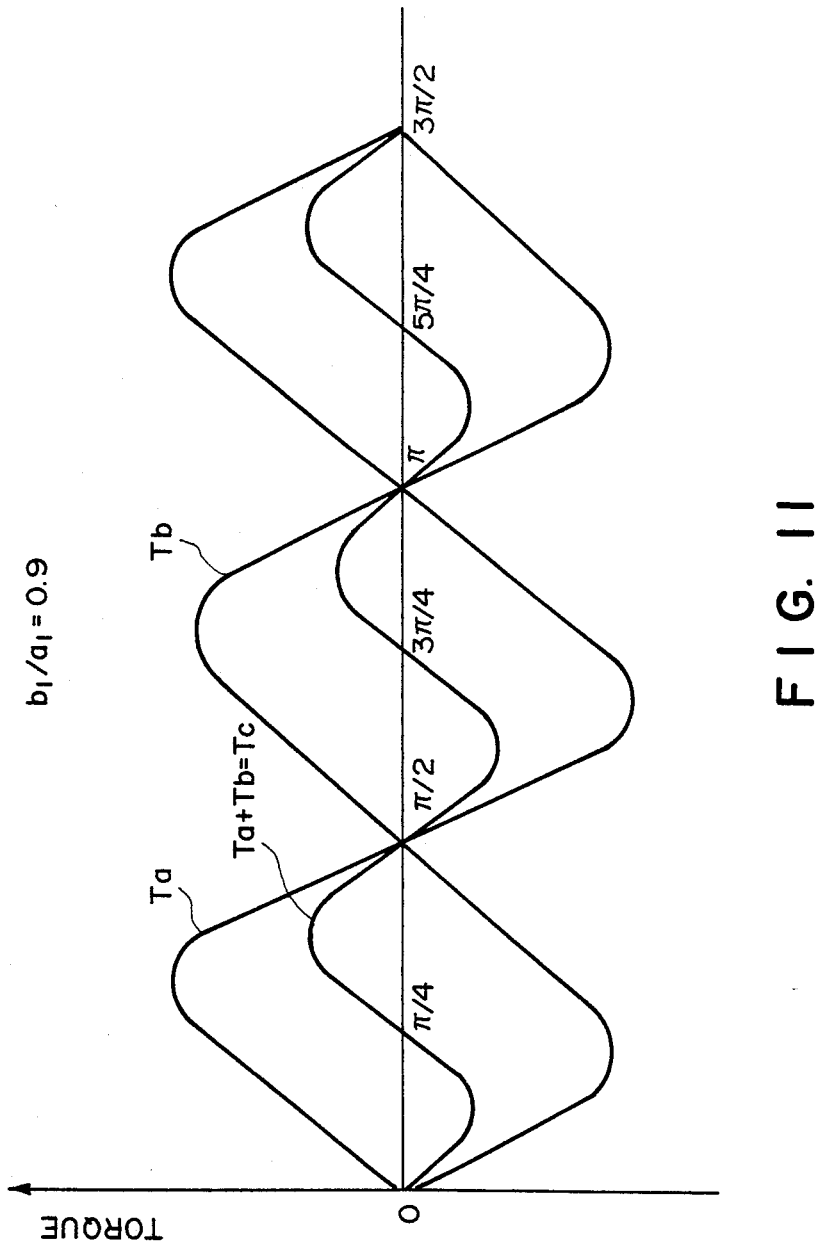
FIG. 11 is a chart showing the cogging torque as a function of the angle $\alpha$ in case $b_1/a_1 = 0.9$.

FIG. 11 shows the cogging torques Ta, Tb and Tc in case of $a_2 > 0$, $b_2 > 0$ and $b_1/a_1 = 0.9$.

In each stator set with p pairs of stator poles, Ta and Tb can be represented as:

$$Ta = a_1 \sin 2p\theta - a_2 \sin 4p\theta \quad (9)$$

$$Tb = b_1 \sin 2p(\theta + \pi/2p) - b_2 \sin 4p(\theta + \pi/2p) \quad (10)$$

wherein $\theta$ is the mechanical position of rotor taken as $\theta = 0$ where $\alpha = 0$, so that $\theta = 2\pi$ after a full rotation of the rotor. In the foregoing example $p = 12$.

As explained in the foregoing, a stepping motor without an angular error in each step of the rotor can be obtained by adding a second-order harmonic wave component to the basic wave component. The second-order harmonic wave component, of a doubled frequency compared with the basic wave component, can be approximately obtained by doubling the number of the stator poles with respect to the rotor poles.

FIG. 12 shows a stepping motor constituting a first embodiment of the present invention, wherein provided is a 2-pole rotor with an N-pole and an S-pole. Facing said rotor there is provided a first stator 16 with two stator poles 16-1, 16-2. A bifilar coil 17 is wound on said stator 16, so that the polarity of the stator pole 16-1, 16-2 can be varied by controlling the direction of current supply to said coil. On the axis of the rotor 15 there is provided an identical second stator 18 in such a manner that the stator poles 18-1, 18-2 face the rotor with an aberration of $\pi/2$ in electric angle (or 90° in mechanical angle). A bifilar coil 19 is provided on the second stator.

Figure 3:
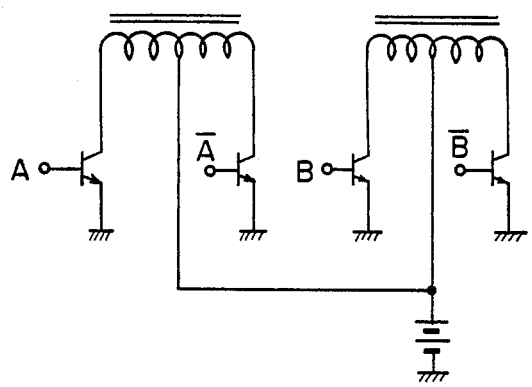
FIG. 3 is a diagram of a driving circuit of the stepping motor.
Figure 4:
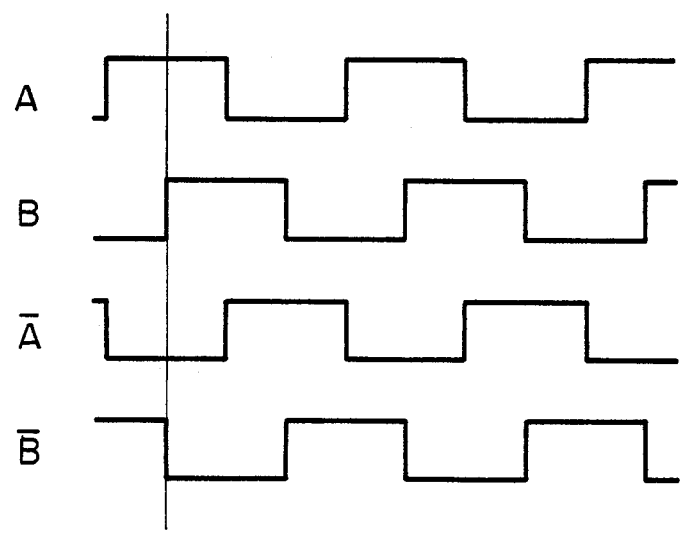
FIG. 4 is a timing chart of the driving pulses of the stepping motor.
Figure 5A:
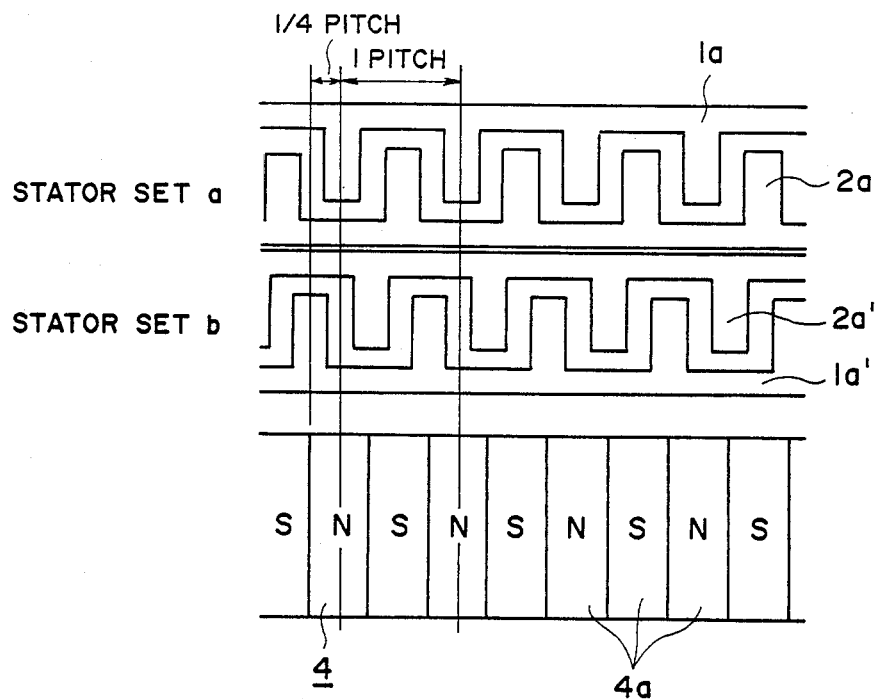
FIG. 5A is an extended view of the magnetic poles of the stepping motor.
Figure 5B:
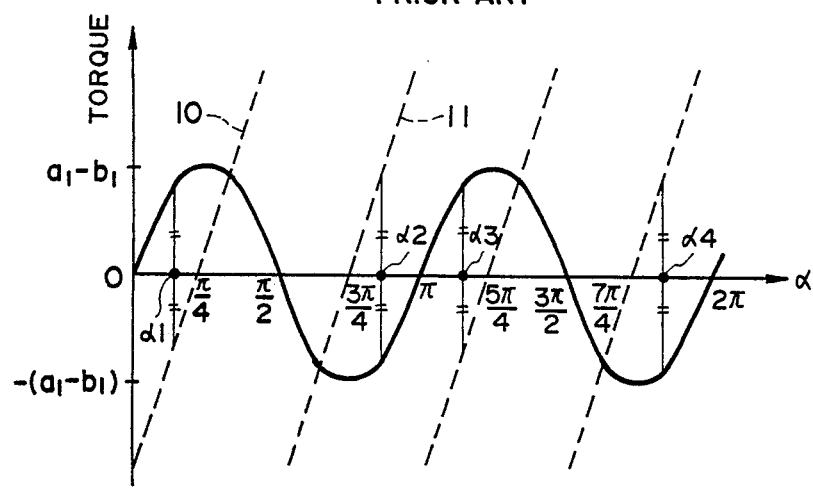
FIG. 5B is a chart showing the stop positions of the rotor.
Figure 5C:
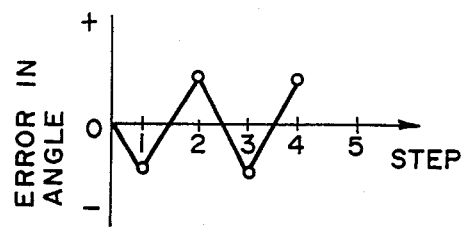
FIG. 5C is a chart showing the angular errors in the rotor position.
Figure 5D:
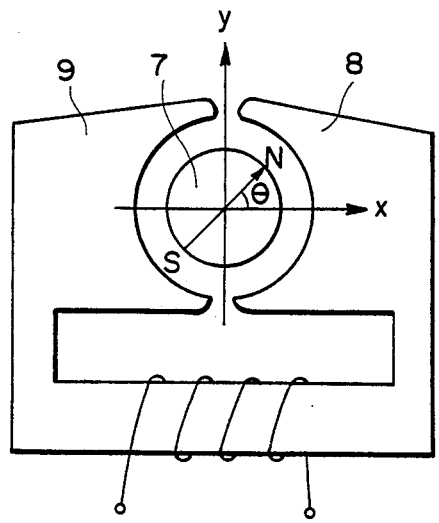
FIG. 5D is a schematic view of a conventional two-pole stepping motor.
Figure 6:
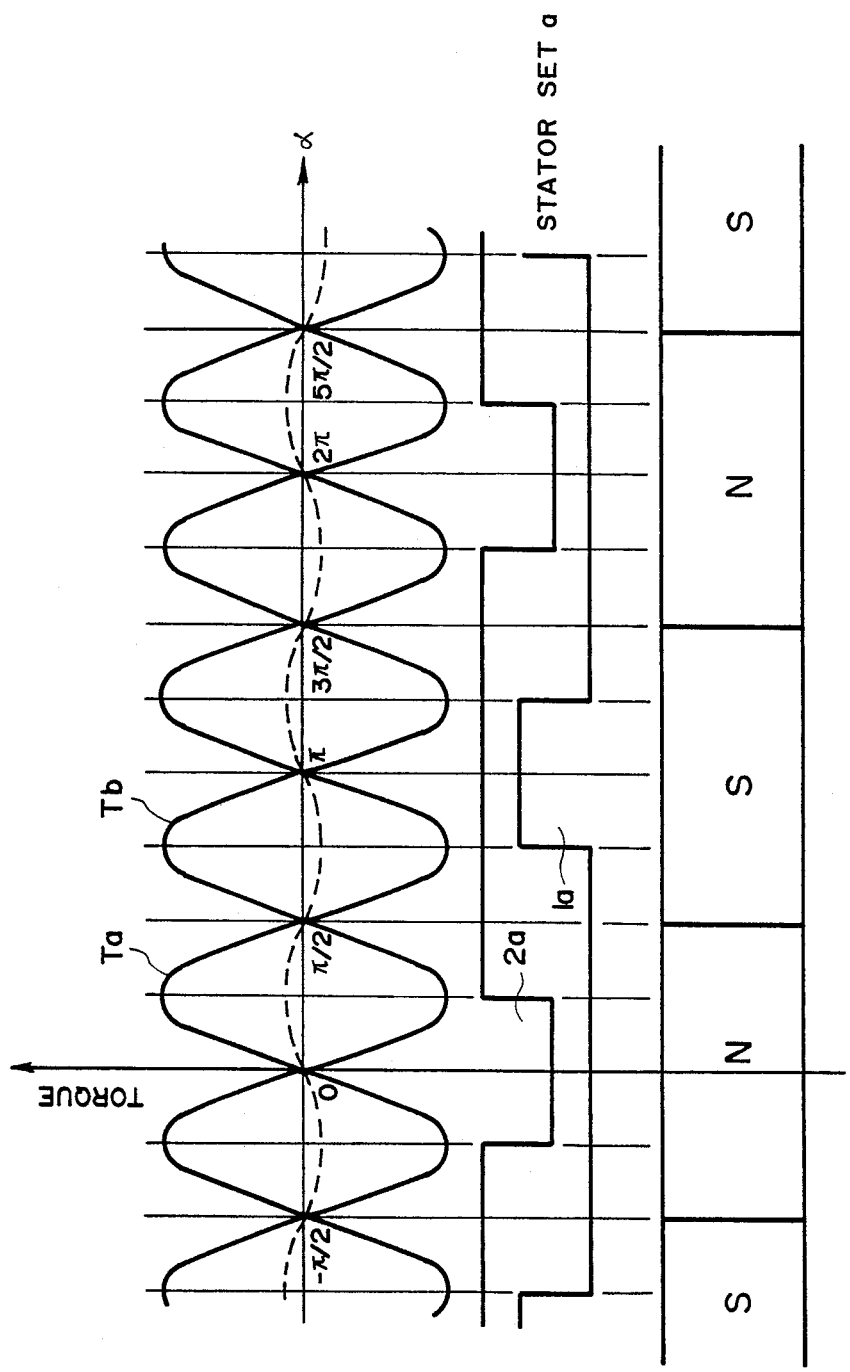
FIG. 6 is a chart showing the cogging torque of the stator set a as a function of angle $\alpha$.
Figure 7:
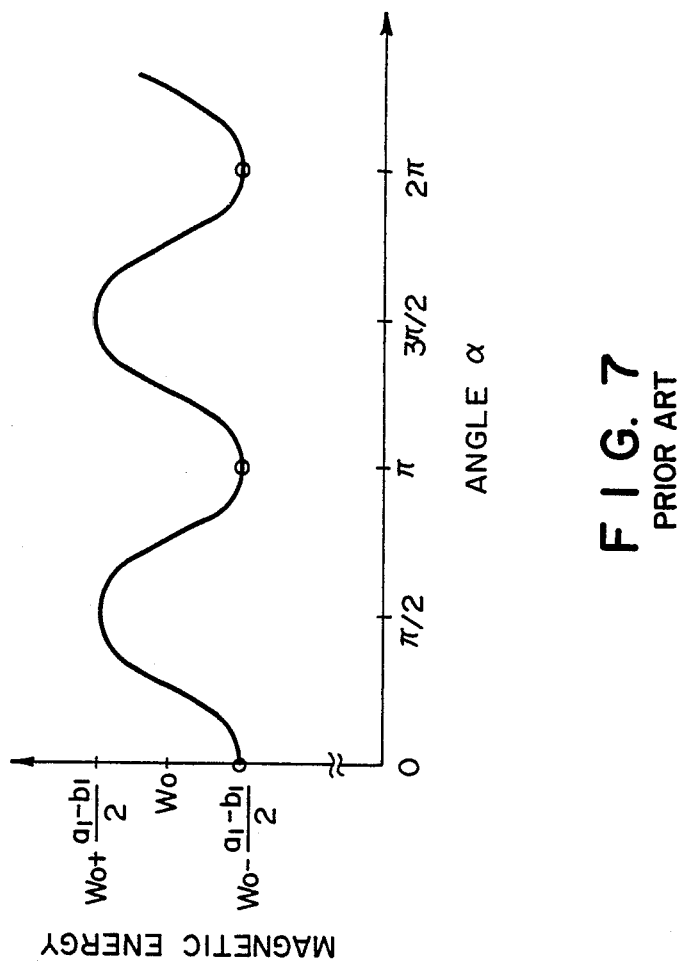
FIG. 7 is a chart showing the stop positions of the rotor.

The above-mentioned stepping motor can be driven with a circuit as shown in FIG. 3, and with a drive timing as shown in FIG. 4.

In the present embodiment, the stator poles 16-1, 16-2, 18-1, 18-2 are provided, at the center of the faces directed toward the rotor, with deep grooves running in the axial direction of the rotor 15. In the present embodiment, therefore, each stator has four pseudo stator poles for generating a second-order harmonic wave component, so that the magnetic energy W can be represented as:

"basic component" + "second-order harmonic wave component" + "constant" =
$-\Delta W_1 \cos 2\alpha + \Delta W_2 \cos 4\alpha + W_0$ Therefore, as explained before, the stepping motor of the present embodiment can stop at positions $\alpha = \pi/4$, $3\pi/4$, $5\pi/4$, $7\pi/4$, ... in the energized state practically free from the influence of cogging torque, so that the angular error in each stop is significantly reduced.

Figure 2:
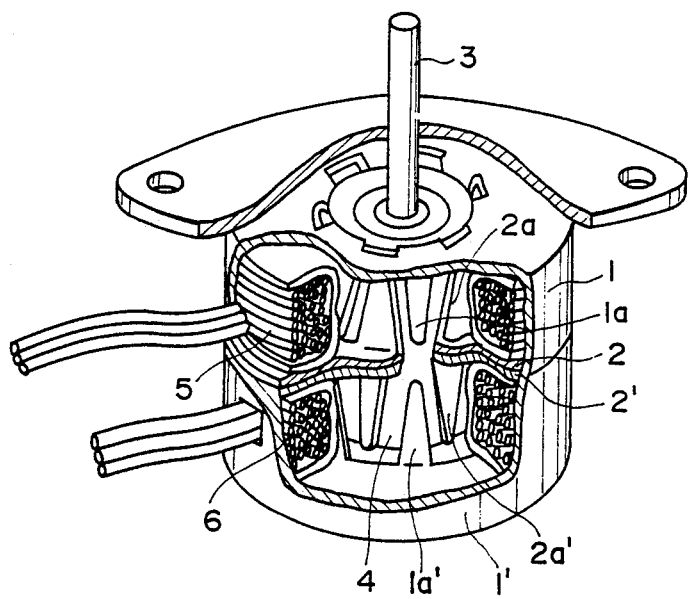
FIG. 2 is a schematic view of a stepping motor.

FIG. 13 shows a first stator set 20 employed in a second embodiment of the present invention, and a second stator set is identical with said first set. The stepping motor of said embodiment has a basic structure the same as shown in FIG. 2 (in the number of magnetic poles of the rotor, number of stator poles, driving method etc.), but the stator poles 23, 24 of the stators 21, 22 are respectively provided, at the center of the faces directed to the rotor, with grooves 23a, 24a parallel to the axis of the rotor. The present embodiment achieves identical effects with those in the first embodiment. The grooves 23a, 24a can be easily formed by adding, to the conventional pressing step, a stamping step for forming a recess.

The grooves 23a, 24a may also be replaced by recesses of circular or oval shape in plan view. In essence it is necessary to form, on the central axis of the stator pole, a recess of a shape uubstantially symmetrical to said central axis, but the shape of said recess is not critical.

The grooves are provided on all the stator poles in the foregoing embodiments, but they may be provided on a part of the stator poles. The number, dimension and depth of said recesses affect the magnetic reluctance when the magnetic pole of the rotor faces the stator pole, and a larger number and/or dimension leads to a larger magnetic reluctance, and a larger coefficient of sin $4\alpha$ or a larger magnitude of the cogging torque.

Also in the foregoing embodiments the stator poles are pointed toward an end, but they may be bent in the middle for achieving the effects of the present invention.

Figure 1:
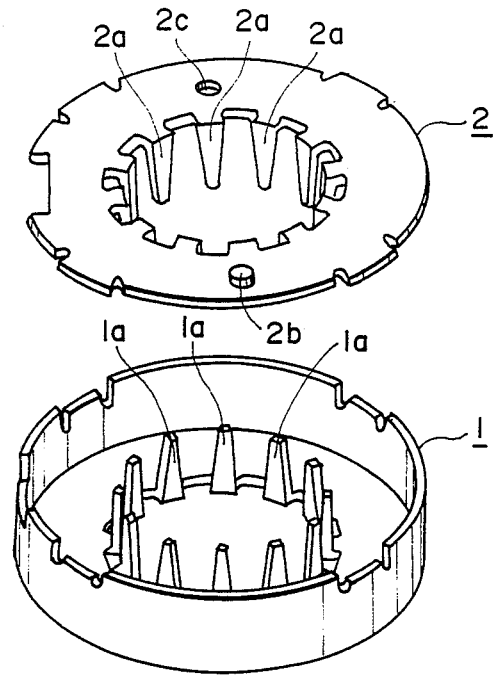
FIG. 1 is a schematic view of a conventional stator set.
Figure 14:
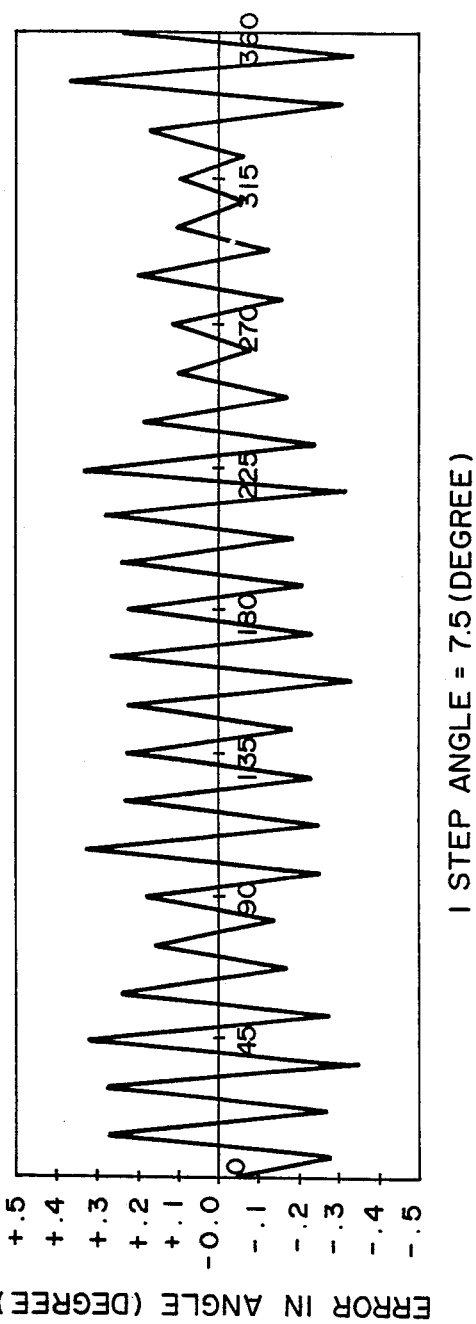
FIG. 14 is a chart showing the experimental performance of a conventional example.
Figure 15:
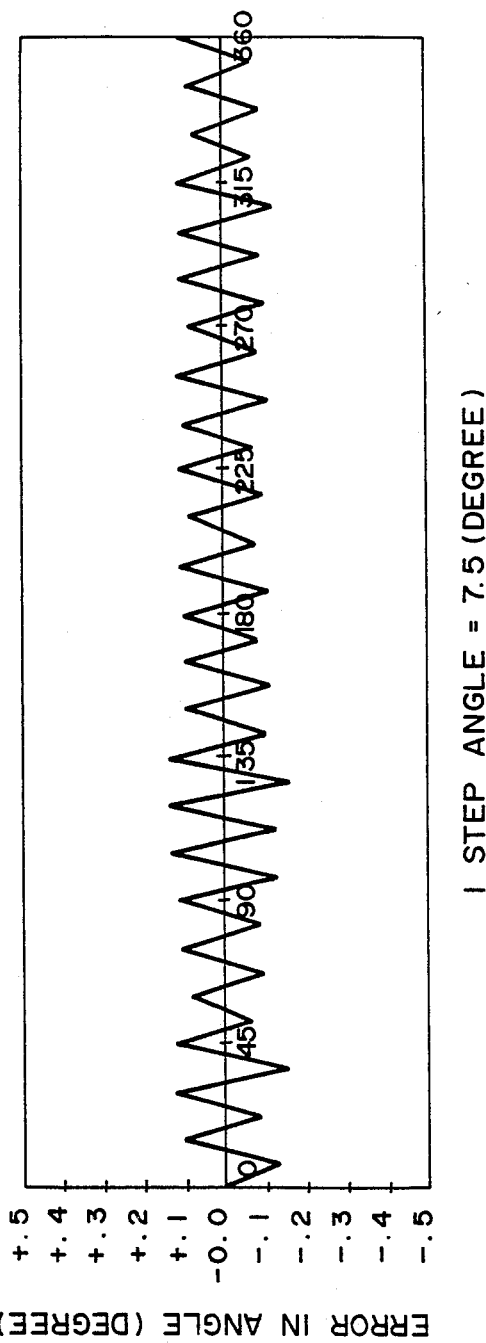
FIG. 15 is a chart showing the experimental performance of the second embodiment.

FIG. 14 shows the experimental results of angular error in each step in a conventional stepping motor shown in FIGS. 1 and 2. The specifications of the motor are:

outer diameter : 42 mm
stator thickness : 17 mm
stator inner diameter : 22.4 mm
stator pole thickness : 0.8 mm
stator width at the base : 2.5 mm
stator width at the top : 0.7 mm
inductance : 93 Ω
driving voltage : 18 V FIG. 15 shows the experimental results of angular error in each ste in the embodiment shown in FIG. 13. The specifications of the motor are same as those corresponding to FIG. 14, except for the presence of grooves 23a, 24a, which have a width of 0.4 mm and a depth of 0.4 mm.

As will be apparent from FIG. 15, the angular error in each step is significantly reduced, and the rotation of the rotor when the energization is cut off is also significantly reduced. These results are considered to verify that the grooves provided on the stator poles function to generate a second-order harmonic aave component, with a coefficient opposite in sign to that of the basic wave component.

FIG. 16 shows a second embodiment of the present invention, wherein the number of independent stator poles is doubled, instead of forming grooves in the stator poles.

In the present embodiment the rotor 25 has two poles whereas the first stator set 26 is provided with four stator poles 27-1 to 27-4 respectively provided with bifilar coils 28. In a direction perpendicular to the plane of drawing, there is provided an unrepresented second stator set, which is identical with the first stator set but is aberrated by an electric angle of $\pi/4$ or a mechanical angle of 90°. The driving circuit and the drive timing in the present embodiment can be substantially the same as those shown in FIGS. 3 and 4 as in the first embodiment. In the present embodiment, the stator poles 27-1 and 27-2 are always magnetized to a same polarity as a pair, and the stator polss 27-3 and 27-4 are likewise magnetized in pair. Also in the second stator set, the stator poles overlapping with the poles 27-1, 27-3 of the first stator set 26 are magnetized in pair, and other stator poles overlapping with the poles 27-2 and 27-4 are magnetized in pair.

The present embodiment achieves also the same effects as in the foregoing embodiment.

The present invention is not limited to the foregoing embodiments. For example the magnetic poles of the rotor may be displaced by $\pi/4$, instead of displacing the second stator set by $\pi/4$ with respect to the first stator set.

FIG. 17 shows a first stator set 120 employed in another embodiment of the present invention, and a second stator set is identical with said first set. The stepping motor of the present embodiment has a basic structure same as shown in the conventional motor (in the number of magnetic poles of the rotor, number of stator poles, driving method etc.), and the stator poles 123, 124 of the stators 121, 122 are provided, at the center of the faces directed to the rotor, with projections 123a, 124a parallel to the axis of the rotor. This embodiment also provides, same effects as those in the first embodiment. Said projections 123a, 124a can be easily formed by adding, to the conventional pressing step, a step for forming said projection.

Said projections 123a, 124a need not be linear but can be circular or oval in plan view. It is necessary to form, on the central axis of the stator pole, a projection substantially symmetrical to said central axis, but the form of said projection is not critical.

The projections are provided on all the stator poles in the present embodiment, but they may also be provided on a part of the stator poles. The number, dimension, length and height of said projections affect the magnetic reluctance when the magnetic pole of the rotor faces the stator pole, and a larger number and/or a larger dimension of the projections leads to a smaller magnetic reluctance, or a smaller coefficient of sin 4α or a larger cogging torque.

In the present embodiment the stator poles are pointed toward an end, but they may also be bent for achieving the effect of the present invention.

FIG. 18 shows another embodiment of the present invention, wherein a base portion 130 of the stator and a stator pole 131 form an angle θ larger than 90°. The stator pole 131 is pointed toward the end. Thus the gap to the rotor 132 is axially uniform but becomes narrower toward the end of the stator pole. The pointed shape of the stator pole toward the end and the angle θ>90° provides an effect the same as that obtained by the projection at the center of the stator pole, thus reducing the magnetic reluctance when the center of the magnetic pole of the rotor faces the center of the stator pole. Also a bent shape of the pole provides a similar effect.

FIG. 19 shows another embodiment of the present invention, wherein the stator pole 136 of the stator 135 has a curved face directed to the rotor 137, and the center of curvature is positioned opposite to the rotor. Consequently the magnetic energy or magnetic reluctance is reduced when the center of the magnetic pole of the rotor faces the center of the stator pole.

The present invention is not limited to the foregoing embodiments. For example the magnetic pole of the rotor may be displaced by π/4 instead of displacing the second stator set by π/4 with respect to the first stator set.

In the foregoing embodiments two stator sets are arranged in the axial direction of the rotor, but the effects of the present invention can be achieved also if two stator sets are arranged in radial direction.

As explained in the foregoing, the present invention prevents the generation of cogging torque in the rotor stop positions in energized state, thereby significantly reducing the angular error of the rotor in each step, by dividing a stator pole of a magnetic polarity practically into plural areas at least in a face thereof directed to the rotor, in such a manner to form a central area of a high magnetic reluctance.

What is claimed is:
1. A stepping motor comprising:
   a permanent magnet rotor provided with magnetic poles on the periphery thereof;
   first and second stator sets, each having magnetic pole plates provided with tooth-shaped pole pieces extended in the axial direction and arranged at substantially uniform intervals around said rotor; and
   a coil for magnetizing said tooth-shaped pole pieces; wherein said tooth-shaped pole pieces are divided by a high reluctance area so that the magnetic reluctance of each pole piece changes substantially symmetrically with respect to the central axis thereof.

2. A stepping motor according to claim 1, wherein said tooth-shaped pole pieces of either or both of said first and second stator units are provided with grooves at the approximate center of the faces thereof directed to said rotor.

3. A stepping motor according to claim 2, comprising a predetermined number of said grooved tooth-shaped pole pieces at a predetermined pitch.

4. A stepping motor according to claim 1, wherein said tooth-shaped pole pieces of either or both of said first and second stator units are provided respectively with projecting portions on the faces thereof directed to said rotor.

5. A stepping motor according to claim 1, wherein said tooth-shaped pole pieces of either or both of said first and second stator units are provided respectively with curved faces directed to said rotor.

6. A stepping motor according to claim 1 wherein said tooth-shaped pole pieces form an angle larger than 90° with their respective pole plates.

* * * * *

UNITED STATES PATENT AND TRADEMARK OFFICE
CERTIFICATE OF CORRECTION

PATENT NO. : 4,794,292
DATED : December 27, 1988
INVENTOR(S) : AKIRA TORISAWA

It is certified that error appears in the above-identified patent and that said Letters Patent is hereby corrected as shown below:

IN [56] REFERENCES CITD

"3,496,393  2/1970  Reieman et al." should read
--3,496,393  2/1970  Reifman et al.--.

COLUMN 2

Line 2, "a" should read --an--.
Lines 10-12, "$Tb = b_1 sin2p \left(\theta + \frac{1}{4} \cdot \frac{2\pi}{p}\right) = b_1 sin2p \left(\theta + \frac{\pi}{2p}\right)^{(4)}$" should read
--$Tb = b_1 sin2p \left(\theta + \frac{1}{4} \cdot \frac{2\pi}{p}\right) = b_1 sin2p \left(\theta + \frac{\pi}{2p}\right)^{(4)}$--.

Line 34, "is different" should read --is only different--.
Line 63, "$\pi 2\pi$," should read --$\pi, 2\pi$,--.

COLUMN 3

Line 7, "whlle" should read --while--.

COLUMN 4

Line 17, "secondorder" should read --second-order--.
Line 51, "ls" should read --is--.

UNITED STATES PATENT AND TRADEMARK OFFICE
CERTIFICATE OF CORRECTION

PATENT NO. : 4,794,292

DATED : December 27, 1988

INVENTOR(S) : AKIRA TORISAWA

It is certified that error appears in the above-identified patent and that said Letters Patent is hereby corrected as shown below:

COLUMN 5

Line 7, "abovementioned" should read --above-mentioned--.
    Line 12, "at" should read --at--.

COLUMN 6

Line 8, "$a_2>0.$" should read --$b_1>0.$--.
    Line 11, "90/4" should read --$\pi/4$--.
    Line 17, "$3\pi/4, 5\pi/4,$" should read --$3\pi/4, \pi, 5\pi/4,$--.
    Line 41, "interferring" should read --interfering--.

COLUMN 7

Line 6, "stator pole 16-1, 16-2" should read --stator poles 16-1, 16-2--.
    Line 51, "uubstantially" should read --substantially--.

COLUMN 8

Line 12, "ste" should read --step--.
    Line 22, "aave" should read --wave--.
    Line 41, "stator polss" should read --stator poles--.
    Line 65, "provides," should read --provides the--.
    Line 68, "projection." should read --projections.--.

UNITED STATES PATENT AND TRADEMARK OFFICE
CERTIFICATE OF CORRECTION

PATENT NO. : 4,794,292

DATED : December 27, 1988

INVENTOR(S) : AKIRA TORISAWA

Page 3 of 3

It is certified that error appears in the above-identified patent and that said Letters Patent is hereby corrected as shown below:

COLUMN 10

Line 42, "claim 1" should read --claim 1,--.

Signed and Sealed this

Twenty-third Day of January, 1990

Attest:

JEFFREY M. SAMUELS

Attesting Officer     Acting Commissioner of Patents and Trademarks